Aug. 18, 1959     B. HAYDEN     2,900,203

TURNBUCKLE FOR LOOM HARNESS

Filed Dec. 12, 1957

INVENTOR.

Boyd Hayden

BY Morse r Altman

ATTORNEYS

United States Patent Office 2,900,203
Patented Aug. 18, 1959

2,900,203

TURNBUCKLE FOR LOOM HARNESS

Boyd Hayden, Newtonville, Mass.

Application December 12, 1957, Serial No. 702,326

1 Claim. (Cl. 287—60)

This invention relates to a turnbuckle designed for use in attaching a dobby cord to a harness frame of a loom. Looms have a series of harness frames side by side which are closely spaced. Dobby cords are attached to the upper edges of these frames so that they can be selectively raised and lowered in the formation of patterns in the textile which is being woven. It is often desirable to make fine adjustments in the effective length of any of these dobby cords. The present invention relates to the turnbuckle for use in connecting a dobby cord to the top of a harness frame, the turnbuckle being adjustable to vary its length and being characterized by the fact that the terminal end members one of which is attached to the frame and the other is attached to the dobby cord, are maintained in a common plane which is the same as the plane of the frame itself. Since one or both of these terminal members may be in the form of a hook, it is important that the plane of hook itself be thus maintained in the same plane as the frame as otherwise the hook would project to one side or the other and be liable to injure the next frame as the frames are raised and lowered. Hence, according to the present invention, a turnbuckle is provided in which the terminal members can be adjusted toward or from each other but are held against relative rotation about the axes of their shanks.

For a more complete understanding of the invention reference may be had to the following description of certain embodiments thereof, and to the drawing of which—

Figure 1:
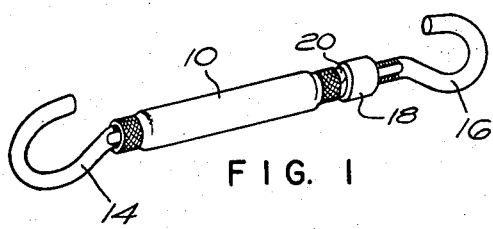
Figure 1 is a perspective view of a turnbuckle embodying the invention.
Figure 2:
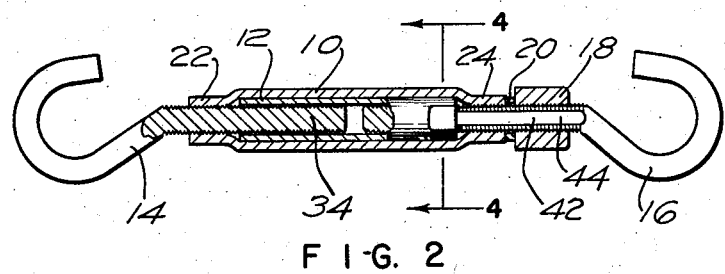
Figure 2 is a side elevation of the same, mostly broken away to show in section.
Figure 3:
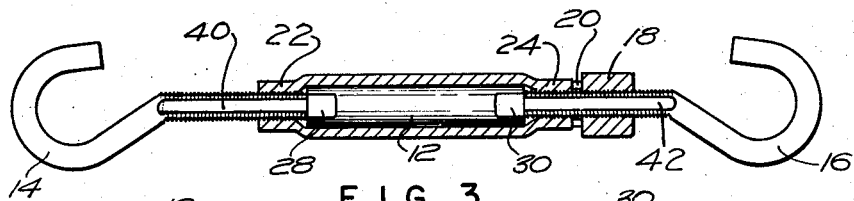
Figure 3 is a side elevation of the same, the outer members being shown in section.

The turnbuckle shown in Figures 1, 2 and 3 consists of an outer sleeve 10, an inner sleeve 12, terminal members 14 and 16, a nut 18 and a lock washer 20. The outer sleeve 10 is reduced in size at its end portions 22 and 24, these end portions being cuffs which are internally screw threaded. Within the outer sleeve 10 between the cuffs 22 and 24 is the tubular inner sleeve 12, the end portions of which are slightly flattened as indicated at 28 and 30 to form non-round orifices 32 at the ends of the inner sleeve.

Figures 4, 5:
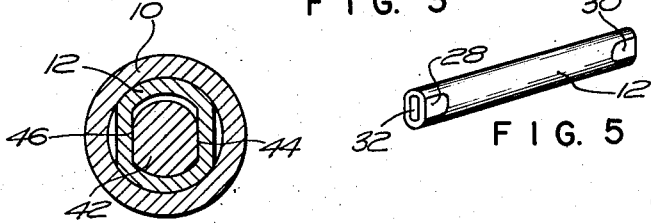
Figure 4 is a cross sectional view on an enlarged scale, taken on the line 4—4 of Figure 2.
Figure 5 is a perspective view of an inner sleeve employed in the turnbuckle shown in Figures 1 to 3.

The terminal members 14 and 16, as shown, are hooks. The member 14 has a shank 34 which slidably fits into the orifice 32 of the inner sleeve 12 so that it can move axially with respect to the inner sleeve but cannot rotate relatively thereto. The shank 34 is screw threaded for threaded engagement within the cuff 22 of the outer sleeve 10. The orifice 32 and the cross section of the shank 34 which fits therein can have any suitable non-round shape. For this purpose the shank 34 may be conveniently made with one or more longitudinal flats, one such flat being illustrated at 40 in Figure 3. In like manner the terminal member 16 has a screw threaded shank 42 which is provided with two longitudinal flats 44 and 46 illustrated in Figure 4. The threads on the shanks 34 and 42 are opposite, that is, one is a right hand thread and the other is a left hand thread. When the sleeve 10 is turned relatively to the terminal members 14 and 16, the latter move toward or away from each other and thus adjust the overall length of the turnbuckle as a whole. Since, however, the shanks are each non rotatably connected with the inner sleeve 26, they are non rotatable with reference to each other. Hence, the terminal members 14 and 16 are properly assembled with the sleeve 12, the hooks are maintained in a common plane.

In order to hold the turnbuckle in any position of adjustment, the nut 18 is threaded on the portion of the shank 42 which is exterior to the outer sleeve 10. Preferably the lock washer 20 is between the nut 18 and the adjacent end of the cuff 24. When an adjustment has been made, the nut 18 is set up against the washer 20 so that the terminal member 16 cannot then turn with respect to the outer sleeve 10. Since it cannot turn with respect to the inner sleeve 26 nor the terminal member 14, it follows that the latter cannot turn with respect to either the inner sleeve 12 or the outer sleeve 10. The turnbuckle is thus locked until the nut 18 is backed off to permit the further adjustment.

Figure 6:
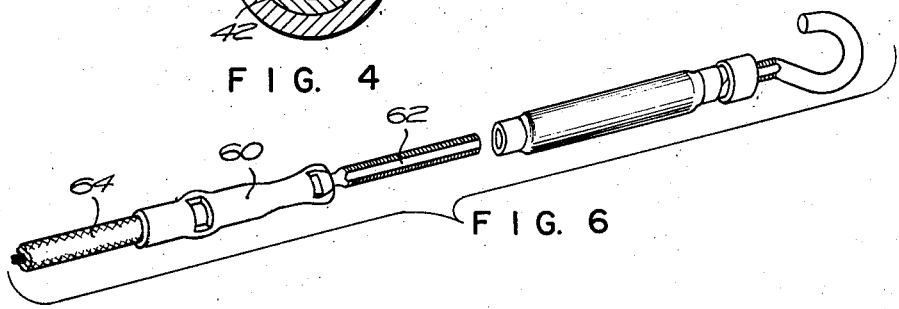
Figure 6 is a perspective view of a modified form of the invention, part of the turnbuckle being shown separated from the rest of it.

While the terminal members 14 and 16 are shown in the form of simple hooks, the outer end portions may be of other shapes if desired. For example, Figure 6 shows a turnbuckle one terminal member 60 of which has a threaded shank 62 and an outer portion which is directly and permanently secured to a dobby cord 64. The operation of the turnbuckle as a whole, however, is as herein before described.

I claim:

A turnbuckle for loom harness frames, comprising a tubular outer sleeve having an internally threaded cuff of reduced diameter at each end thereof, two terminal members each having a shank formed with a longitudinal flat and in threaded engagement with one of said cuffs, an inner sleeve nested within said outer sleeve between said cuffs, said inner sleeve having end portions slightly flattened to form non-round orifices shaped to receive the shanks of said members slidably but non-rotatably, a nut threaded on one of said shanks, and a lock-washer between said nut and the adjacent end of said outer sleeve.

References Cited in the file of this patent

UNITED STATES PATENTS

| | | |
|---|---|---|
| 1,003,355 | Green | Sept. 12, 1911 |
| 1,359,391 | Landymore et al. | Nov. 16, 1920 |
| 1,374,963 | Stevenson | Apr. 19, 1921 |
| 1,418,298 | Gorman | June 6, 1922 |
| 1,903,695 | Chobert | Apr. 11, 1933 |
| 2,420,363 | Espenas | May 13, 1947 |